(12) United States Patent
Shinoda et al.

(10) Patent No.: US 11,070,144 B2
(45) Date of Patent: Jul. 20, 2021

(54) CONVERTER PROVIDED WITH A CIRCUIT FOR MANAGING ALTERNATING POWER IN AN ALTERNATING PART

(71) Applicants: SUPERGRID INSTITUTE, Villeurbanne (FR); CENTRALESUPELEC, Gif-sur-Yvette (FR)

(72) Inventors: Kosei Shinoda, Lyons (FR); Jing Dai, Gif-sur-Yvette (FR); Abdelkrim Benchaib, Montigny le Bretonneux (FR); Xavier Guillaud, Bachy (FR)

(73) Assignees: SUPERGRID INSTITUTE, Villeurbanne (FR); CENTRALESUPELEC, Gif-sur-Yvette (FR)

(*) Notice: Subject to any disclaimer, the term of this patent is extended or adjusted under 35 U.S.C. 154(b) by 0 days.

(21) Appl. No.: 16/628,705

(22) PCT Filed: Jul. 4, 2018

(86) PCT No.: PCT/FR2018/051664
§ 371 (c)(1),
(2) Date: Jan. 6, 2020

(87) PCT Pub. No.: WO2019/008275
PCT Pub. Date: Jan. 10, 2019

(65) Prior Publication Data
US 2020/0195165 A1    Jun. 18, 2020

(30) Foreign Application Priority Data
Jul. 7, 2017   (FR) ..................... 17 56433

(51) Int. Cl.
*H02M 7/48*  (2007.01)
*H02M 7/483*  (2007.01)
(Continued)

(52) U.S. Cl.
CPC ........... *H02M 7/483* (2013.01); *H02M 1/082* (2013.01); *H02M 1/10* (2013.01); *H02M 7/2173* (2013.01); *H02M 2007/4835* (2013.01)

(58) Field of Classification Search
CPC ........ H02M 7/483; H02M 1/082; H02M 1/10; H02M 7/2173; H02M 2007/4835
See application file for complete search history.

(56) References Cited

U.S. PATENT DOCUMENTS

| | | | |
|---|---|---|---|
| 2012/0191391 A1* | 7/2012 | Angquist | H02M 7/49 702/64 |
| 2013/0148392 A1* | 6/2013 | Inoue | H02M 7/483 363/68 |

(Continued)

FOREIGN PATENT DOCUMENTS

| | | |
|---|---|---|
| EP | 3142236 A1 | 3/2017 |
| FR | 1557501 A | 2/1969 |
| GB | 1220084 A | 1/1971 |

*Primary Examiner* — Kyle J Moody
*Assistant Examiner* — Lakaisha Jackson
(74) *Attorney, Agent, or Firm* — Workman Nydegger

(57) ABSTRACT

The invention relates to a multi-level modular converter provided with a control circuit comprising a computer to calculate an internal control setpoint of the converter and an energy management circuit allowing a power setpoint to be determined that is to be transmitted to the alternating electrical power supply network, the control circuit being configured to regulate the voltage at the point of connection of the converter to the direct electrical power supply network and to regulate the voltage at the terminals of each capacitor modelled as a function of the internal control setpoint and of the power setpoint to be transmitted to the alternating electrical power supply network.

17 Claims, 8 Drawing Sheets

(51) Int. Cl.
  *H02M 1/08* (2006.01)
  *H02M 1/10* (2006.01)
  *H02M 7/217* (2006.01)

(56) References Cited

U.S. PATENT DOCUMENTS

| | | | |
|---|---|---|---|
| 2014/0003101 A1* | 1/2014 | Tang | H02M 1/14 363/40 |
| 2014/0146586 A1* | 5/2014 | Das | H02M 1/36 363/49 |
| 2016/0299195 A1 | 10/2016 | Guo | |

* cited by examiner

US 11,070,144 B2

CONVERTER PROVIDED WITH A CIRCUIT FOR MANAGING ALTERNATING POWER IN AN ALTERNATING PART

BACKGROUND

The present invention relates to the technical field of transport installations of multi-terminal high-voltage direct current (HVDC) in which stations integrate multi-level modular converters (MMC).

FIG. 1 schematically illustrates a set 12 of sub-modules of a multi-level modular converter 10 according to the prior art. For a three-phase input/output current (comprising three phases $\varphi_a$, $\varphi_b$ and $\varphi_c$), this converter 10 comprises three conversion legs which are referenced by the indices a, b and c on the different components of FIG. 1.

Each conversion leg comprises an upper arm and a lower arm (indicated by the indices "u" for upper and "l" for lower), each of which connects a terminal DC+ or DC− of the direct electric power supply network (DC) to a terminal of the alternating electric power network (AC). In particular, each of the legs is connected to one of the three phase lines $\varphi_a$, $\varphi_b$ and $\varphi_c$ of the alternating electric power network. FIG. 1 illustrates a set of 12 sub-modules, wherein a current $i_{xi}$ passes through each arm with (x indicating whether the arm is upper or lower and the index i indicating the legs). Also, each arm comprises a plurality of sub-modules $SM_{xij}$ which can be controlled according to a preferred sequence (with x indicating whether the arm is upper or lower, i indicating the phase line to which the arm is connected, and j being the number of the sub-module among the sub-modules in series in the arms). Here, only three sub-modules have been illustrated by arms. In practice, each lower or upper arm can comprise a number N of sub-modules, ranging from a few tens to a few hundreds.

Each sub-module $SM_{xij}$ comprises a power storage system such as at least a capacitor and a control member for selectively connecting this capacitor in series between the terminals of the sub-module or to bypass them. The sub-modules are controlled according to a selected sequence to have the number of power storage elements vary progressively which are connected in series in an arm of the converter 10 so as to supply several levels of voltage. Also, in FIG. 1, $V_{dc}$ designates the voltage at the point of connection of the converter to the direct electric power supply network, $i_{dc}$ designates the current of the direct electric power supply network, while currents $i_{ga}$, $i_{gb}$ and $i_{gc}$ pass through the three phase lines $\varphi_a$, $\varphi_b$ and $\varphi_c$. Also, each arm has an inductance $L_{arm}$ and each phase line comprises an inductance $L_f$ and a resistance $R_f$.

FIG. 2 illustrates a sub-module $SM_{xij}$ belonging to the converter 10 of FIG. 1. This sub-module $SM_{xij}$ has voltage $v_{SM}$ at its terminals. In this sub-module, each control member comprises a first electronic switching element T1 such as an insulated gate bipolar transistor (IGBT) connected in series to an electric power storage element, here a capacitor $C_{SM}$. This first switching element T1 and this capacitor $C_{SM}$ are mounted parallel to a second electronic switching element T2, also an insulated gate bipolar transistor (IGBT). This second electronic switching element T2 is coupled between the input and output terminals of the sub-module $SM_{xij}$. The first and second switching elements T1 and T2 are both connected to an antiparallel diode shown in FIG. 2.

When operating, the sub-module can be controlled in two control states.

In a first state, a so-called "on" or controlled state, the first switching element T1 and the second switching element T2 are configured so as to connect the power storage element $C_{SM}$ in series with the other sub-modules. In a second state, a so-called "off" or non-controlled state, the first switching element T1 and the second switching element T2 are configured so as to short-circuit the power storage element $C_{SM}$.

It is known that each arm, having a voltage $v_m$ at its terminals, can be modelled by a modelled voltage source, having a voltage $v_m$ at its terminals, the duty cycle of which depends on the number of controlled sub-modules, and by a modelled capacitor $C_{tot}$ connected to the voltage source. This modelling is illustrated in FIG. 3, showing an arm, with a current i passing through it and the resulting modelling. $C_{tot}$ is the equivalent capacitance in an arm such that the inverse of this equivalent capacitance of the arm $C_{tot}$ is equal to the sum of the inverses of the capacities of the sub-modules controlled in this arm, according to:

$$\frac{1}{C_{tot}} = \frac{1}{C_1} + \frac{1}{C_2} + \ldots + \frac{1}{C_N}$$

where $C_1, C_2, \ldots, C_j, \ldots, C_N$ are the capacities of the $j^{th}$ capacitor in the arm.

Accordingly, the voltage $v_{c\Sigma}$ at the terminals of the modelled capacitor $C_{tot}$ is equal to the sum of the voltages $v_{cj}$ at the terminals of the capacitors of the sub-modules in the arm (with j ranging from 1 to N and indicating the number of the capacitor and therefore of the sub-module). Also, a current $i_m$ passes through each modelled capacitor $C_{tot}$. In the present application $C_{tot}$ loosely designates both the modelled capacitor and the value of its capacitance. By controlling the control sequence of the sub-modules, to have the number of power storage elements connected in series vary progressively, the energy of the modelled capacitor $C_{tot}$ and therefore the voltage at the terminals of each modelled voltage source can be lowered or raised.

The prior art therefore discloses an equivalent configuration of the set of the sub-modules of the converter MMC 10 illustrated in FIG. 4. In this figure, the converter is a converter similar to that described in reference to FIG. 1, and wherein each arm has been replaced by its modelling. Also, each phase line of the alternating electric power network is connected to a current $i_{gi}$ and a voltage $v_{gi}$ (the index i indicating the number of the legs).

Here, each of the modelled sources of voltage comprises at its terminals a voltage $v_{mxi}$, and a current $i_{mxi}$ passes through each modelled capacitor $C_{tot}$, and comprises at its terminals a voltage $V_{c\Sigma xi}$ (with x indicating whether the arm is upper or lower and i indicating the number of the legs). It can also be seen that it is possible to break down the converter MMC into an imaginary alternating part and an imaginary direct part (at input or output, according to whether the converter is configured to convert alternating energy into direct energy or the inverse), where the evolution of the total energy stored in the capacitors of the sub-modules is equal to the difference between the power entering the converter and the exiting power.

Converters of "Voltage Source Converter" type (familiar to the skilled person under the acronym "VSC") are known, having a station capacitor connected in parallel of the direct electric power supply network. The disadvantage of such a capacitor in parallel is that it does not allow the converter to be disconnected from the voltage of the direct electric power supply network. Also, this type of converter needs to make use of many filters to obtain suitable converted signals.

Also, the inertia of the direct electric power supply network depends on its capacitance such that a large capacitance increases the inertia of the direct electric power supply network. Therefore, a large capacitance of the network and therefore considerable inertia allows it to best resist any disruptions. Inversely, a low network capacitance, and therefore low inertia, more easily and more precisely regulates the voltage at the point of connection of the converter to the direct electric power supply network.

In contrast to converters of Voltage Source Converter type, MMC converters do not include a station capacitor connected in parallel and which can influence the stability of the direct electric power supply network. Multi-level modular converters therefore have the advantage of offering disconnection between the total voltage of the capacitors of the sub-modules and the voltage of the direct electric power supply network. Yet, a simple variation in power can result in a substantial variation in voltage of the direct electric power supply network.

MMC converters are known the control of which is not based on energy (Non Energy-Based Control). In these converters, when any deviation in voltage appears between the voltage of the capacitors of the arms and the voltage of the direct electric power supply network, the power of the incoming direct electric power supply network varies automatically to correct said deviation in voltage. This control is executed without additional regulator since energy exchanges with the capacitors of the arms follow variations in voltage on the direct electric power supply network.

However, all variables of this type of converter are not controlled, which shows up via a lack of robustness of the converter.

Converters having their control based on energy are also known. Especially known is the document titled "Control of DC bus voltage with a Modular Multilevel Converter" (Samimi et al., PowerTech conference, 2015), which presents a multi-level modular converter comprising a control system of power transfers in the region of the alternating part, power transfers in the region of the direct part and of the internal energy of the converter. This type of converter utilises control based on energy ("Energy-Based Control") control of the variables in current of direct and alternating electric supply networks controls the powers of these two respective networks. A difference between the powers of direct and alternating electric supply networks causes a decrease or increase in the energy stored in the capacitors of the sub-modules. But this type of converter impairs disconnection between voltages at the terminals of the capacitors of the sub-modules and voltage of the direct electric power supply network. Also, it does not adapt effectively and in real time to fluctuations in voltages on the direct electric power supply network.

These known converters are not sufficiently robust, in particular with respect to contribution to the stability of the direct electric power supply network. These existing solutions do not fully exploit the capacities of MMC converters in terms of control of the internal energy of the converter jointly with control of the stability of the network DC.

Converters such as described in document FR1557501 are also known. The behaviour of this type of multi-level modular converter is equivalent to that of a virtual capacitor placed in parallel with the direct electric power supply network.

Regulating the internal energy of this converter makes it possible to have the capacitance of the virtual capacitor vary virtually. The advantage is to be able to act on the direct electric power supply network, and contribute to its stability, while maintaining disconnection between the total voltage of the capacitors of the sub-modules and the voltage of said network.

The disadvantage of the solution of document FR1557501 is that this type of converter involves many calculation steps using a large number of intermediate variables. Also, regulation of the internal energy proves long and complex to realize and costly in terms of resources. Also, in the presence of disruption on the direct electric power supply network, it becomes particularly difficult, or even impossible, to control the internal energy of such a converter according to the prior art.

SUMMARY

An aim of the present invention is to propose a multi-level modular converter (MMC) provided with a control circuit of the converter which allows easy regulation of the internal energy of the converter. Another aim is to provide a more robust converter for effectively regulating the internal energy of the converter despite the presence of disruption on the direct electric power supply network.

To achieve this, the invention relates to a multi-level modular voltage converter for converting alternating voltage into direct voltage and inversely, comprising a so-called direct part intended to be connected to a direct electric power supply network and a so-called alternating part intended to be connected to an alternating electric power network, the converter comprising a plurality of legs, each leg comprising an upper arm and a lower arm, each arm comprising a plurality of sub-modules controllable individually by a control member specific to each sub-module and each sub-module comprising a capacitor connectable in series in the arm when the control member of the sub-module is in a controlled state, each arm which can be modelled by a modelled voltage source connected to a duty cycle dependent on a number of capacitors placed in series in the arm, each modelled voltage source being connected in parallel to a modelled capacitor corresponding to total capacitance of the arms.

The converter further comprises a control circuit of the converter comprising a computer of an internal command setpoint of the converter by application of a function having an adjustable input parameter.

According to a general characteristic of the converter, the control circuit of the converter further comprises an energy management circuit configured to deliver an operating power setpoint as a function of the voltage at the terminals of each modelled capacitor, the operating power setpoint being utilised to determine a power setpoint to be transmitted to the alternating electric power supply network, the control circuit being configured to regulate the voltage at the point of connection of the converter to the direct electric power supply network and the voltage at the terminals of each modelled capacitor as a function of the internal command setpoint and of the power setpoint to be transmitted to the alternating electric power supply network.

The adjustable input parameter of the computer can be set any time during regulation operations of the internal energy and done easily by the user. The internal command setpoint can be connected to different types of magnitudes. In a non-limiting way the internal command setpoint can be an internal power setpoint or even a current setpoint. The internal command setpoint calculated by the computer depends on the input parameter. Also, it is possible for the user to act directly on the internal command setpoint of the converter and accordingly regulate the voltage at the point of connection of the converter to the direct electric power supply network and the voltage at the terminals of each modelled capacitor.

The user can further adjust the input parameter as a function of disruptions on the direct electric power supply network to stabilize it.

In a non-limiting way the multi-level modular converter, the control circuit of which is provided with such a computer, behaves the same as that of a virtual capacitor arranged in parallel with the direct electric power supply network. Regulating the adjustable input parameter of the computer has the capacitance of the virtual capacitor vary virtually. The advantage is to be able to act on the direct electric power supply network while maintaining disconnection between the total voltage of the capacitors of the sub-modules and the voltage of the direct electric power supply network.

In contrast to a capacitor placed really in parallel with the direct electric power supply network, the virtual capacitor has no cost and cannot be degraded. In particular, the adjustable virtual capacitor according to the invention can take on very high capacitance values, not materially possible for a real capacitor.

The sub-modules are preferably controlled by means of two insulated gate bipolar transistors (IGBT) for placing the capacitor of said sub-module in the associated arm in series or not according to whether the sub-circuit is to be controlled in the controlled "on" state or in the non-controlled "off" state.

Each arm can be modelled by a modelled source of voltage connected in parallel to a modelled capacitor of capacitance $C_{tot}$. The sum of the voltages of the capacitors of the sub-modules of an arm is noted as $v_{c\Sigma}$, such that the voltage at the terminals of the associated modelled capacitor in parallel with the modelled voltage source is $v_{c\Sigma}$.

The duty cycle α, connected to the modelled voltage source, is preferably calculated as per the expression:

$$\alpha = \frac{n}{N}$$

where n is the number of sub-modules connected to the "on" state in the associated arm and N is the number of sub-modules in the arm.

Also, because of the invention, the energy management circuit provides a power setpoint to be transmitted to the alternating electric power supply network $P^*_{ac}$ and therefore links the voltage at the terminals of each modelled capacitor, from this setpoint. Also, this circuit contributes to regulating the internal energy of the converter by occurring on the alternating part of said converter. An advantage of the energy management circuit is to dispense with disruption on the direct electric power supply network or in the direct part of the converter. In fact, the energy management circuit allows regulation of power in the alternating part of the converter, independently of disruptions in the direct part. The robustness of the converter is therefore improved.

Regulating both the voltage at the point of connection of the converter to the direct electric power supply network and the voltage at the terminals of each modelled capacitor can further act on the stability of the direct electric power supply network. This contains any disruptions in power appearing suddenly on the direct electric power supply network and which could cause considerable variations in voltage on said network.

By way of advantage, the computer is configured to calculate the internal command setpoint by application of a derived function and a filtering function. An advantage is that application of such a filtering function consumes few calculating resources. Also, filtering dispenses with measuring noises which can damage the converter when being controlled.

The filtering function is preferably a filter of the first order, allowing measuring noises to be filtered out all the more effectively.

Advantageously, the adjustable input parameter is an adjustable virtual inertia coefficient $k_{VC}$. Also, modifying this parameter $k_{VC}$ virtually amounts to modifying the capacitance of the virtual capacitor and therefore contributing to the stability of the direct electric power supply network. An advantage is to propose an additional degree of liberty in the control of the internal energy of the converter MMC. The capacitance of the virtual capacitor can especially take on very high values, without additional material restrictions.

According to a first variant, the internal command setpoint is an internal power setpoint $P^*_W$. In this configuration the converter is controlled in terms of power. An advantage is that the computer directly provides a power setpoint, which dispenses especially with an intermediate calculation step of a setpoint of internal energy of the converter, as is the case in the documents of the prior art. Determining this internal power setpoint is therefore easy, as is regulating the internal energy.

In a particularly advantageous way, the computer is configured to calculate the internal power setpoint $P^*_W$ of the converter according to the function:

$$P^*_W = \frac{1}{2} C_{eq} k_{VC} \times \left( v_{dc}^2 \times \frac{s}{1+\tau s} \right)$$

where $C_{eq}=6C_{tot}$ and $C_{tot}$ is the total capacitance in an arm of the modelled capacitor, $v_{dc}$ is the voltage at the point of connection of the converter to the direct electric power supply network and τ is a time constant. The s at the numerator represents the derived function and the filtering function consists of:

$$\frac{1}{1+\tau s}.$$

It is understood that the capacitance $C_{VC}$ of the virtual capacitor is expressed as:

$$C_{VC} = 6 C_{tot} k_{VC}$$

The internal power setpoint $P^*_W$ is preferably utilised to determine a power setpoint $P^*_{dc}$ to be transmitted to the direct electric power supply network. Via determination of this power, noted $P^*_{dc}$, it is understood that the computer contributes to regulation of the internal power, and therefore of the internal energy of the converter by occurring on the direct part of said converter. An advantage is that in case of disruptions on the alternating electric power network or in the alternating part of the converter, the computer always regulates the voltage at the point of connection of the converter to the direct electric power supply network and the voltage at the terminals of each modelled capacitor by supplying the internal power setpoint in the direct part of the converter. As a consequence, the effect of virtual capacitance described earlier stabilizing the direct supply network is retained. The robustness of the converter is therefore improved.

According to a second variant, the internal command setpoint is an internal current setpoint $I^*_W$. In this configuration the converter is controlled in terms of current.

By way of advantage, the computer is configured to calculate the internal current setpoint $I^*_W$ according to the function:

$$I^*_W = C_{eq}k_{VC} \times \left(v_{dc} \times \frac{s}{1+\tau s}\right)$$

where $C_{eq}=6C_{tot}$ and $C_{tot}$ is the total capacitance in an arm of the modelled capacitor, $v_{dc}$ is the voltage at the point of connection of the converter to the direct electric power supply network and $\tau$ is a time constant.

Preferably, the internal current setpoint $I^*_W$ is utilised to determine a current setpoint $I^*_{dc}$ to be transmitted to the direct electric power supply network. Via determination of this current setpoint $I^*_{dc}$, it is understood that the computer contributes to regulation of the current, and therefore of the internal energy of the converter by occurring on the direct part of said converter.

As a consequence, the effect of virtual capacitance described earlier, for stabilizing the direct supply network, is retained, despite any disruptions on the alternating electric power network or in the alternating part of the converter. The robustness of the converter is therefore improved.

In a particular embodiment, the energy management circuit receives at input the result of comparison between a voltage setpoint at the terminals of each modelled capacitor, squared, and an average of the square of the voltages at the terminals of the modelled capacitors. The energy management circuit therefore links the voltage at the terminals of each modelled capacitor, squared, from a setpoint value of this voltage. In particular, the voltage setpoint at the terminals of each modelled capacitor $v^*_{c\Sigma}$ is expressed as:

$$v^{2*}_{c\Sigma} = \frac{2W^*_\Sigma}{6C_{tot}}$$

where $W^*_\Sigma$ is a setpoint of internal energy selected arbitrarily.

The control circuit is preferably configured to make a change in variable to control intermediate variables in current $i_{diff}$ and $i_{gd}$ and in voltage $v_{diff}$ and $v_{gd}$, where $i_{diff}$ and $v_{diff}$ are connected to the direct electric power supply network and $i_{gd}$ and $v_{gd}$ are connected to the alternating electric power supply network.

In a non-limiting way, in the case of a converter of direct energy into alternating energy, these variables express the variation in internal energy of the converter in the form of:

$$\frac{dW_\Sigma}{dt} = \sum_{i=1}^{3} 2i_{diff_i}v_{diff} - i_{gd}v_{gd}$$

This expression reflects especially the breakdown of the converter MMC into an imaginary direct part at input, connected to the direct network and associated with the term $\Sigma_{i=1}^{3} 2i_{diff_i}v_{diff}$ which corresponds to the power of the direct part and an imaginary alternating part at output, connected to the alternating network and associated with the term $i_{gd}v_{gd}$ which corresponds to the power of the alternating part.

Advantageously, the control circuit comprises a regulator of the current $i_{gd}$ having at input a setpoint $i^*_{gd}$ corresponding to the current $i_{gd}$. The regulator links the current $i_{gd}$ by having it tend towards its setpoint $i^*_{gd}$. Regulating the variable $i_{gd}$ amounts to regulating the transfers of alternating power at input or at output according to the configuration of the converter.

By way of advantage, the control circuit comprises a regulator of the current $i_{diff}$ having at input a setpoint $i^*_{diff}$ corresponding to the current $i_{diff}$. The regulator links the current $i_{diff}$ by having it tend towards its setpoint $i^*_{diff}$. Regulating the variable $i_{diff}$ amounts to regulating transfers of direct power at input or at output according to the configuration of the converter.

In a non-limiting way, the variables $i_{gd}$ and $i_{diff}$ can be controlled independently. It is understood that regulating $i_{diff}$ and $i_{gd}$ regulates transfers of respectively incoming and outgoing powers, and accordingly controls the internal energy of the converter stored in the capacitors of the sub-modules.

Preferably, the control circuit comprises a voltage regulator at the point of connection of the converter to the direct electric power supply network configured to determine a power setpoint for the regulation of the direct voltage of said converter as a function of a voltage setpoint at the point of connection of the converter to the direct electric power supply network and of a voltage value at the point of connection of the converter to the direct electric power supply network collected on said direct electric power supply network. An advantage of this regulator is that it can link the voltage at the point of connection of the converter to the direct electric power supply network $v_{dc}$ by having its value tend towards the voltage setpoint at the point of connection of the converter to the direct electric power supply network $v^*_{dc}$.

The invention also relates to a control process of a multi-level modular voltage converter, the converter converting alternating voltage into direct voltage and inversely, and comprising a so-called direct part intended to be connected to a direct electric power supply network and a so-called alternating part intended to be connected to an alternating electric power network, the converter comprising a plurality of legs, each leg comprising an upper arm and a lower arm, each arm comprising a plurality of sub-modules controllable individually by a control member of the sub-module and comprising a capacitor connected in series in the arm in a controlled state of the control member of the sub-module, each arm which can be modelled by a modelled voltage source connected to a duty cycle dependent on a number of capacitors placed in series in the arm, each modelled voltage source being connected in parallel to a modelled capacitor corresponding to a total capacitance of the arm, the process further comprising calculation of an internal power setpoint of the converter by application of a function having an adjustable input parameter, the process comprising:

a step for determining an operating power setpoint as a function of the voltage at the terminals of each modelled capacitor;
  a step for determining a power setpoint to be transmitted to the alternating electric power supply network from the operating power setpoint; and
  a step for regulating the voltage at the point of connection of the converter to the direct electric power supply network and of the voltage at the terminals of each modelled capacitor as a function of said internal power setpoint and of said power setpoint to be transmitted to the alternating electric power supply network.

Advantageously, the adjustable input parameter is an adjustable virtual inertia coefficient $k_{VC}$.

The invention also relates to a control circuit for a multi-level modular converter such as defined hereinabove and comprising a computer of an internal command setpoint of the converter by application of a function having an adjustable input parameter, the control circuit further comprising an energy management circuit configured to deliver an operating power setpoint as a function of the voltage at the terminals of each modelled capacitor, the operating power setpoint being utilised to determine a power setpoint to be transmitted to the alternating electric power supply network, the control circuit being configured to regulate the voltage at the point of connection of the converter to the direct electric power supply network and the voltage at the terminals of each modelled capacitor as a function of the internal command setpoint and of the power setpoint to be transmitted to the alternating electric power supply network.

BRIEF DESCRIPTION OF DRAWINGS

The invention will be more clearly understood from the following description of embodiments of the invention given by way of non-limiting examples in reference to the appended drawings, in which.

DETAILED DESCRIPTION

Figure 5:
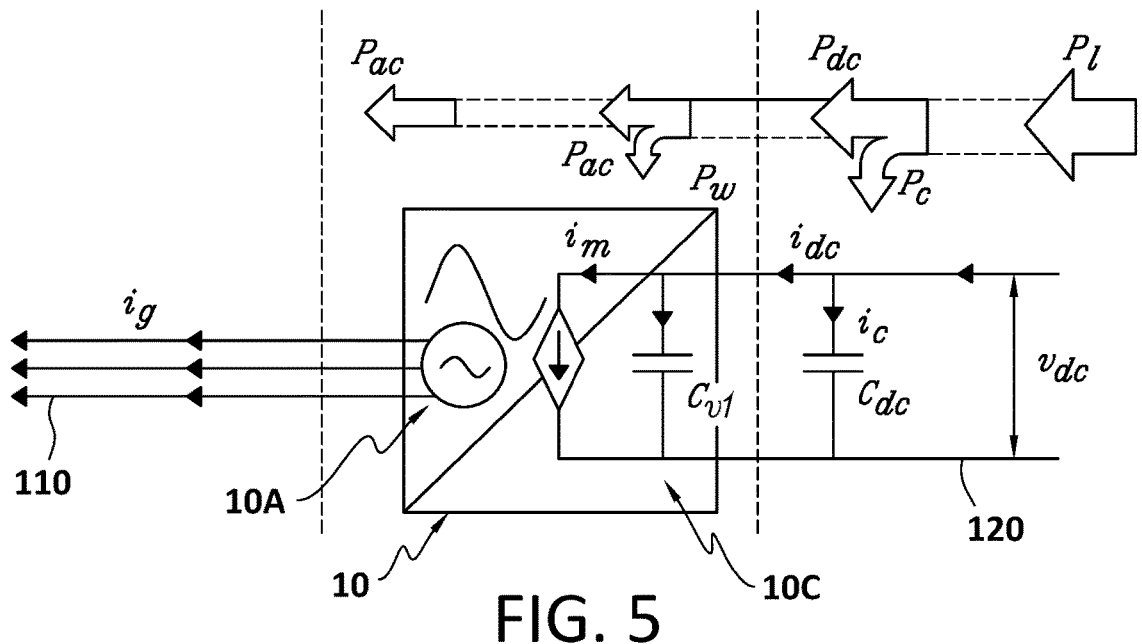
FIG. 5 illustrates an equivalent and schematic representation of a multi level modular converter according to the invention.

The invention relates to a multi-level modular converter provided with a control circuit, a circuit of equivalent behaviour of which is illustrated in FIG. 5. In a non-limiting way this figure illustrates an MMC converter 10 of direct power into alternating power. In this example, it is evident that this converter 10 comprises an alternating part 10A, connected to an alternating electric power network 110, in the left part of the diagram. The right part of the diagram shows that the converter 10 comprises a direct part 10C connected to a direct electric power supply network 120.

It can be seen that a virtual capacitor $C_{VI}$ having adjustable capacitance (loosely put and for reasons of simplicity, the same notation will be used to designate the capacitor and its capacitance) is connected in parallel to the direct electric power supply network 120. Virtual means that this capacitor is not physically implanted in the converter 10, which comprises capacitors of sub-modules only. On the contrary, the control circuit according to the invention achieves converter operation similar to that of a converter equipped with this virtual capacitor: regulating a virtual inertia coefficient $k_{VC}$, which does not appear in FIG. 5, and which is an adjustable parameter, improves the stability of the direct electric power supply network 120 and the behaviour of the converter is similar to that of a converter wherein a virtual capacitor $C_{VI}$ of adjustable capacitance is placed in parallel with the direct electric power supply network 120.

The diagram of FIG. 5 also illustrates transfers of powers between the converter 10 and the direct and alternating electric supply networks 120 and 110. In this way, $P_I$ is the power coming from other stations of the direct electric power supply network and symbolizes sudden disruption in power on the direct network, $P_{dc}$ is the power extracted from the direct electric power supply network 120, $P_{ac}$ is the power transmitted to the alternating electric power supply network 110, $P_C$ is the power absorbed by the capacitance $C_{dc}$ of the direct electric power supply network 120 and $P_W$ can be considered as the power absorbed by the virtual capacitor $C_{VI}$. Also, $v_{dc}$ is the voltage at the point of connection of the converter to the direct electric power supply network. $i_g$ is the current of the alternating electric power network and $i_{dc}$ is the current of the direct electric power supply network.

In the converter MMC 10 according to the invention, and in contrast to a converter MMC of the prior art, a power surplus of the direct electric power supply network 120, noted $P_W$, is absorbed by the virtual capacitor $C_{VI}$ and allows the converter to store internal energy $W_\Sigma$ in the capacitors of the sub-modules.

Figure 6:
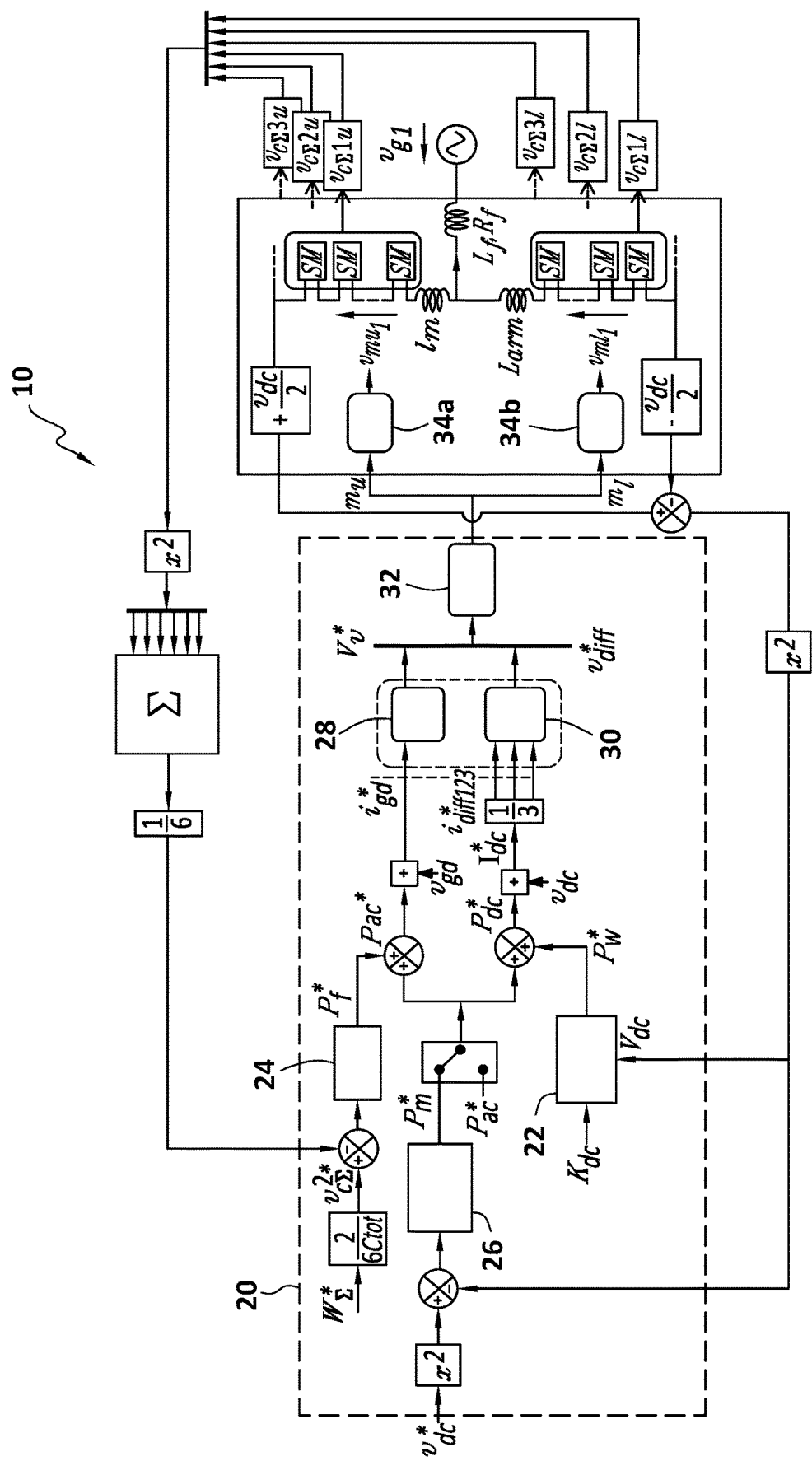
FIG. 6 illustrates a first embodiment of a multi-level modular converter provided with a control circuit according to the invention.

The example of FIG. 6 illustrates a first embodiment of a multi-level modular converter 10 provided with a control circuit 20 according to the invention. In this example, the converter is controlled in terms of power. By linking in closed loop, the converter MMC 10 is configured to regulate the voltage $v_{dc}$ at the point of connection of the converter to the direct electric power supply network 120 and the voltage $v_{c\Sigma}$ at the terminals of each modelled capacitor.

The control circuit 20 comprises a computer 22 configured to calculate an internal power setpoint $P^*_W$ for the capacitors of the sub-modules of the arms. This internal power setpoint $P^*_W$ is calculated from an adjustable virtual inertia coefficient $k_{VC}$, at input of the computer 22, and from a nominal value of the voltage $V_{dc}$ at the point of connection of the converter to the direct electric power supply network 120, squared.

Figure 7:
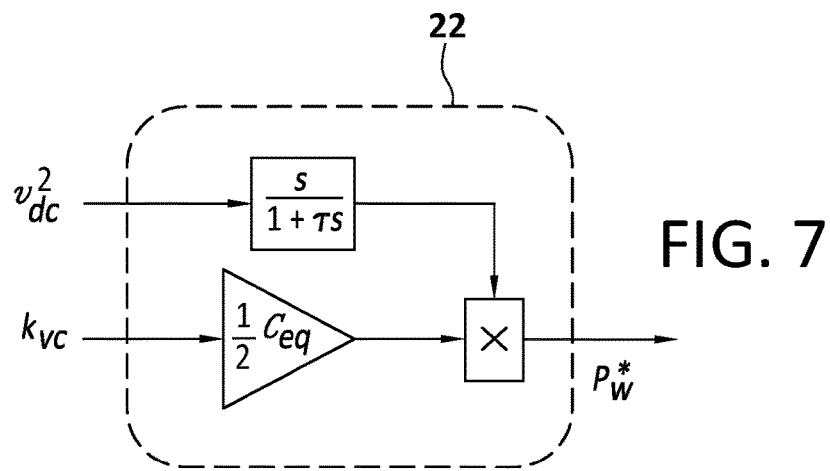
FIG. 7 illustrates a computer of the converter of FIG. 6.

An example of a computer 22 of a power setpoint $P^*_W$ is shown in FIG. 7. This figure shows that said internal power setpoint $P^*_W$ is determined according to the formula:

$$P^*_W = \frac{1}{2} C_{eq} k_{VC} \times \left( v_{dc}^2 \times \frac{s}{1 + \tau s} \right)$$

where $C_{eq}=6C_{tot}$ and $C_{tot}$ is the total capacitance in an arm of the modelled capacitor, $v_{dc}$ is the voltage at the point of connection of the converter to the direct electric power supply network and τ is a time constant. The s au numerator represents the derived function and the filtering function consists of:

$$\frac{1}{1+\tau s}.$$

In particular, the control circuit 20 according to the invention dispenses with an intermediate step for determining a setpoint of internal energy executed in the prior art.

Said internal power setpoint $P^*_W$ is utilised to determine a power setpoint $P^*_{dc}$ to be transmitted to the direct electric power supply network. It is understood that the computer 22 contributes to regulation of the internal power, and therefore of the internal energy of the converter 10 by occurring on the direct part 10C of said converter. An advantage is que in case of disruption on the alternating electric power network 110 or in the alternating part 10A of the converter, the computer 22 always regulates the voltage $v_{dc}$ at the point of connection of the converter to the direct electric power supply network and the voltage $v_{c\Sigma}$ at the terminals of each modelled capacitor by providing the power setpoint to be transmitted to the direct electric power supply network $P^*_{dc}$ in the direct part of the converter.

Also, the control circuit 20 of the converter 10 also comprises a power management circuit 24 configured to deliver an operating power setpoint $P^*_f$. The power management circuit 24 receives at input a comparison between a voltage setpoint $v^*_{c\Sigma}$ at the terminals of each modelled capacitor, squared, and an average of the square of the voltages at the terminals of the modelled capacitors, also squared. Without departing from the scope of the invention, the average can be calculated in different ways. In the non-limiting example illustrated in FIG. 6, the average is calculated as being the sum of the squares of the voltages of the modelled capacitors in each arm, divided by six (the converter comprising six arms).

The voltage setpoint at the terminals of each modelled capacitor $v^*_{c\Sigma}$ is expressed as:

$$v^{2*}_{c\Sigma} = \frac{2W^*_\Sigma}{6C_{tot}}$$

Said voltage setpoint $v^*_{c\Sigma}$ at the terminals of each modelled capacitor is therefore obtained from a setpoint of internal energy $W^*_\Sigma$ of the converter, fixed arbitrarily.

Said operating power setpoint $P^*_f$ is utilised to determine a power setpoint $P^*_{ac}$ to be transmitted to the alternating electric power supply network 110. It is understood that the circuit 24 allows management of the internal energy of the converter 10 by occurring on the alternating part 10A of said converter. An advantage is that even in the presence of disruption on the direct electric power supply network 120 or in the direct part 10C of the converter 10, the power management circuit 24 effectively regulates the voltage $v_{dc}$ at the point of connection of the converter to the direct electric power supply network 120 and the voltage $v_{c\Sigma}$ at the terminals of each modelled capacitor by providing the power setpoint to be transmitted to the alternating electric power supply network $P^*_{ac}$ in the alternating part of the converter 10.

FIG. 6 also shows that the control circuit 20 comprises a voltage regulator 26 at the point of connection of the converter to the direct electric power supply network 120, having at input the result of comparison between a voltage setpoint $v^*_{dc}$ at the point of connection of the converter 10 to the direct electric power supply network 120, squared, and a value $v_{dc}$ collected on the direct electric power supply network, also squared. The voltage regulator 26 at the point of connection of the converter to the direct electric power supply network 120 delivers a power setpoint $P^*_m$ for regulation of the direct voltage of said converter 10. Said power setpoint $P^*_m$ for regulation of the direct voltage of said converter is then compared to the operating power setpoint $P^*_f$ to determine the power setpoint $P^*_{ac}$ to be transmitted to the alternating electric power supply network 110.

Similarly, the internal power setpoint $P^*_W$ is compared to the power setpoint $P^*_m$ for regulation of the direct voltage of said converter to determine the power setpoint $P^*_{dc}$ to be transmitted to the direct electric power supply network.

Also, the control circuit 20 comprises a regulator 28 of the current alternating $i_{gd}$ having at input a setpoint $i^*_{gd}$, and a regulator 30 of the current $i_{diff}$ having at input a setpoint $i^*_{diff}$.

Figure 1:
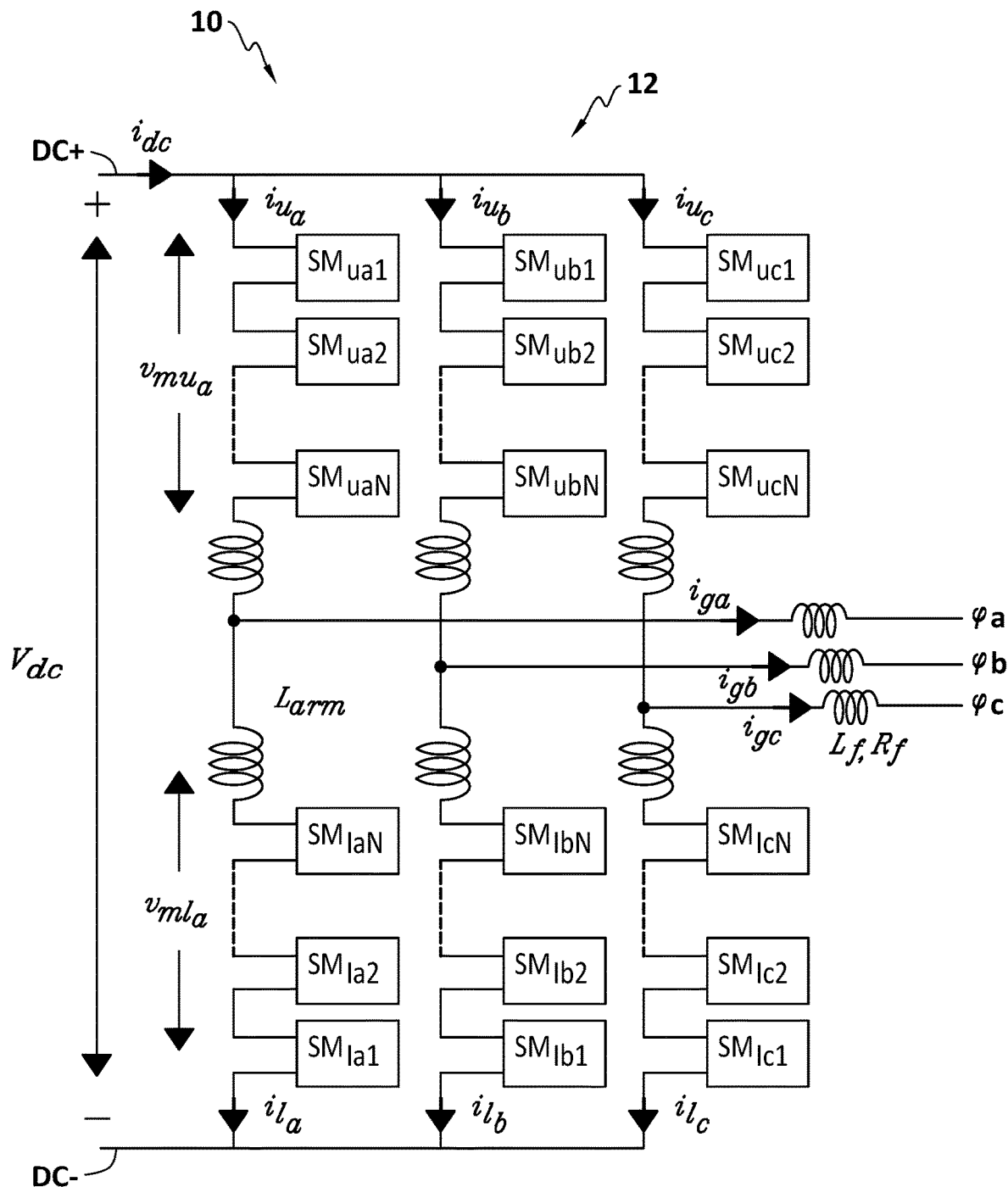
FIG. 1, already described, illustrates a three-phase multi-level modular converter according to the prior art.
Figure 2:
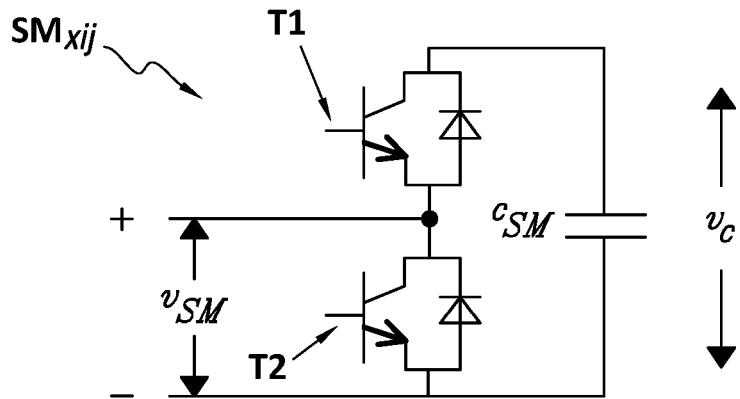
FIG. 2, already described, illustrates a sub-module of a multi-level modular converter according to the prior art.
Figure 3:
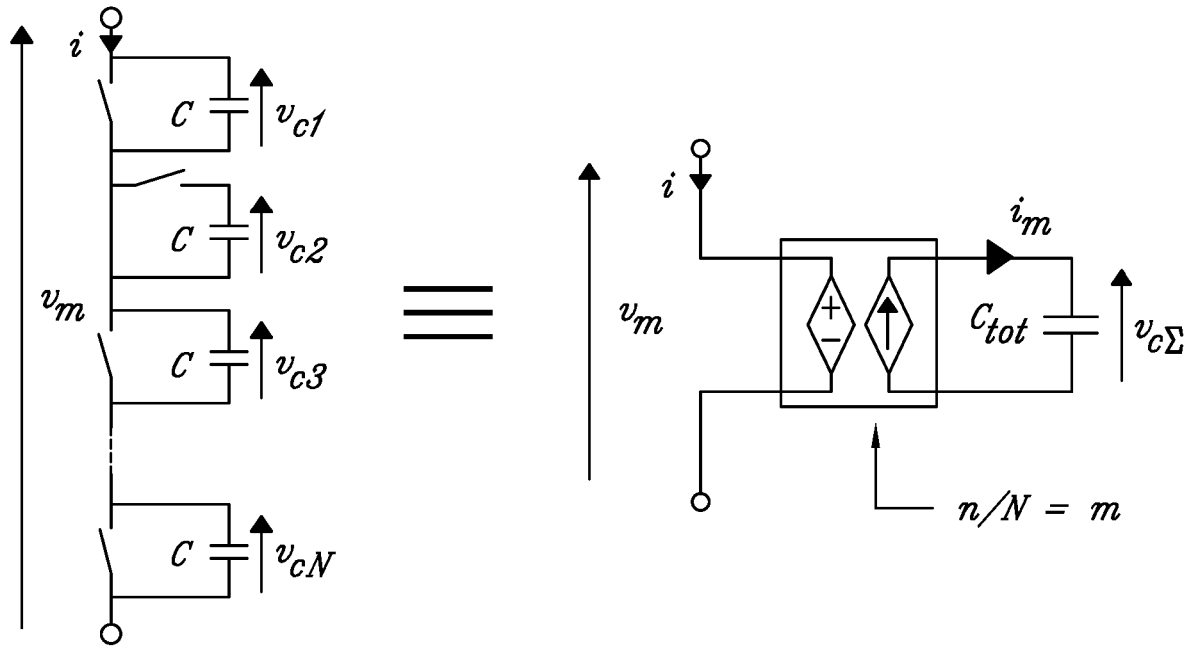
FIG. 3, already described, illustrates a circuit equivalent to an arm of an MMC converter according to the prior art.
Figure 4:
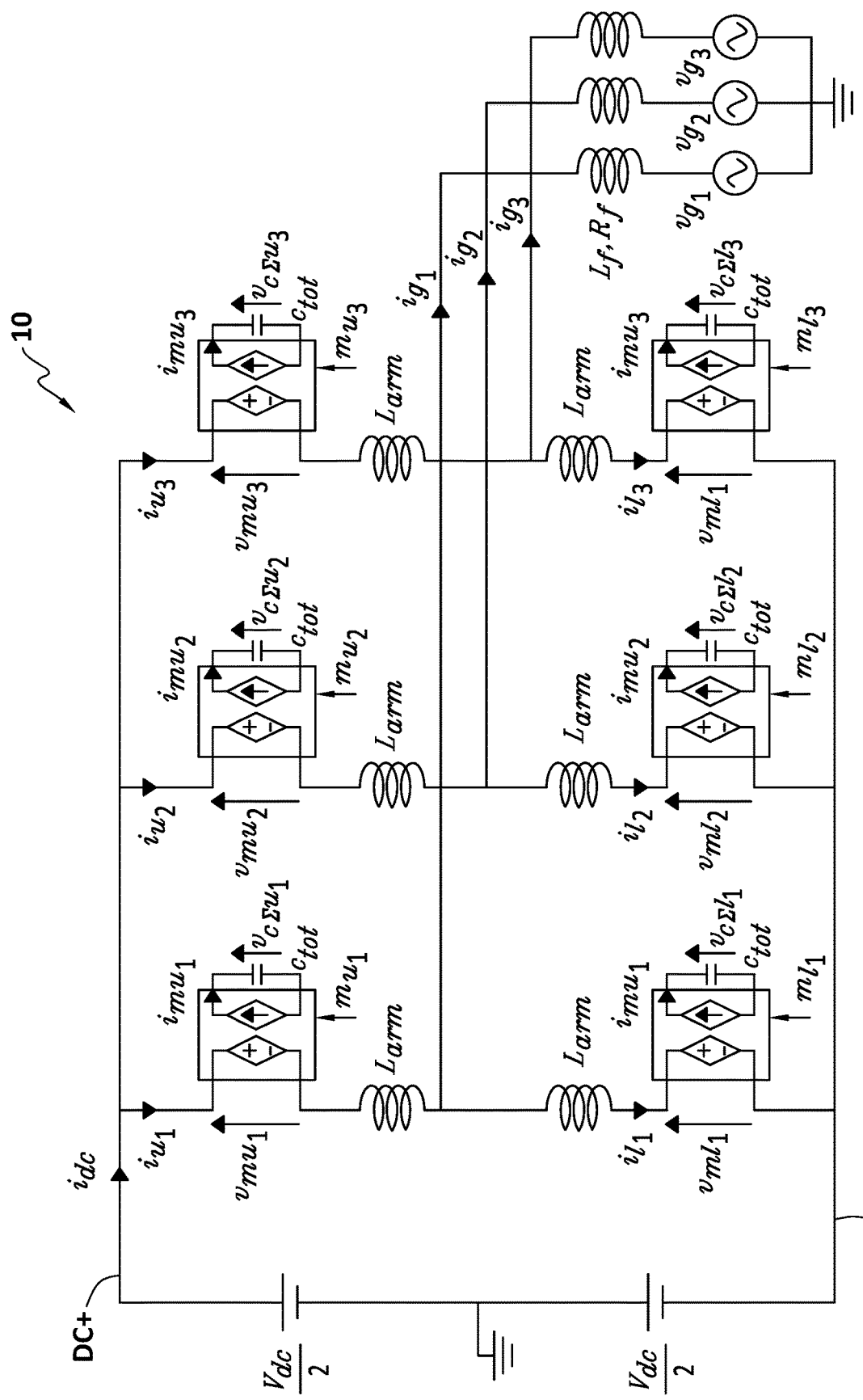
FIG. 4, already described, shows an equivalent configuration of a multi level modular converter according to the prior art.

According to FIG. 3, it is known that it is possible to model the sub-modules of an arm by a modelled voltage source connected in parallel to a modelled capacitor such that the sources of modelled voltages at their terminals a voltage $v_{mxi}$ (with x indicating whether the arm is upper or lower and i indicating the legs). The current regulators 28 and 30 deliver voltage setpoints $v^*_{diff}$ and $v^*_v$ used following a change in variable, by a modulation member 32 and two equilibrium members 34a and 34b by means of a control algorithm ("BCA: Balancing Control Algorithm"), for regulating voltages $v_{mxi}$ at the terminals of the sources modelled voltages. This controls the sub-modules of the arms, or not. The voltage is therefore controlled at the terminals of the modelled capacitors $v_{c\Sigma xi}$ as well as the voltage at the point of connection of the converter to the direct electric power supply network $V_{dc}$.

Having the virtual inertia coefficient $k_{VC}$ vary at input of the computer can therefore directly influence the voltage of the direct electric power supply network $v_{dc}$ and the inertia of this direct electric power supply network.

The diagram of FIG. 6 illustrates control of active powers for control of the converter. In a non-limiting way, control of the reactive powers can be provided, in parallel with control of active powers, independently of the effect of "virtual capacitor".

FIGS. 8 to 11 illustrate the results of simulation of the behaviour of a multi-level modular converter 10 provided with a control circuit 20 according to the invention and in particular simulation by control of power. In this simulation, a test system has been created wherein the direct part of the converter is connected to an ideal source of direct power, simulating a direct electric power supply network 120, while the alternating part of the converter is connected to a source of alternating power, simulating an alternating electric power network 110. A power echelon is imposed on the simulated direct network, simulating disruption on said direct electric power supply network.

Figure 9:
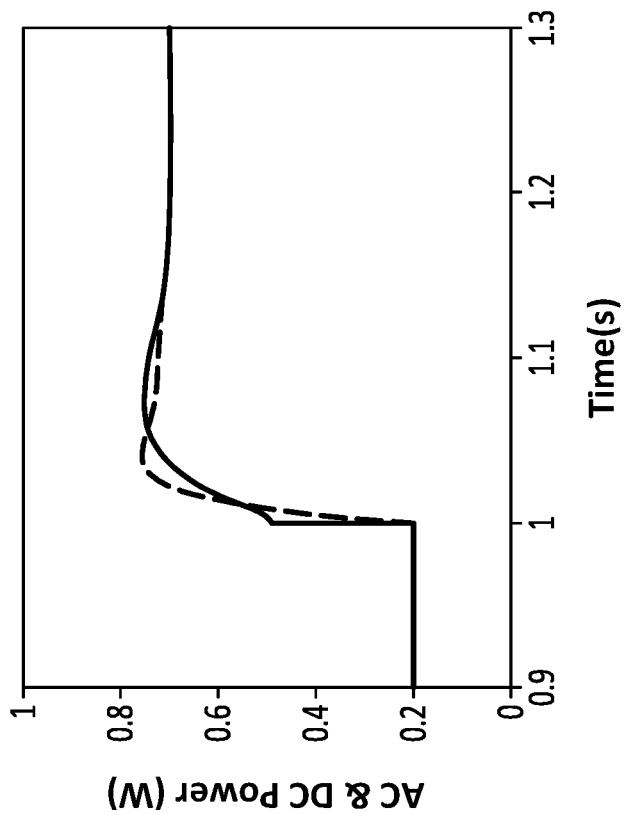
FIG. 9 illustrates the evolution of the power of direct and alternating electric supply networks in response to a disruption, for a converter according to the invention.
Figure 8:
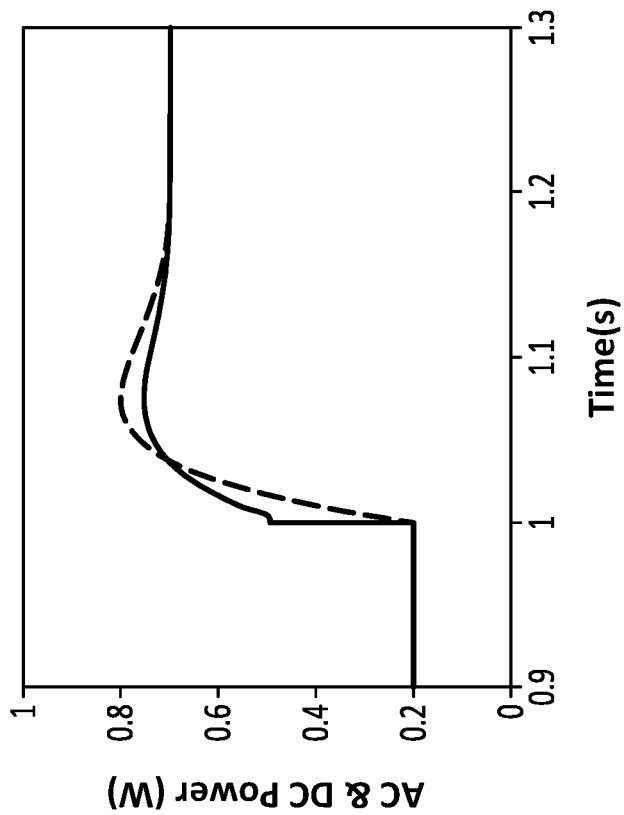
FIG. 8 illustrates the evolution of the power of direct and alternating electric supply networks in response to disruption, for a converter of the prior art.

FIG. 8 shows the evolution of the power $P_{ac}$ of the alternating electric power network in dotted lines and, in solid lines, shows the evolution of the power $P_{dc}$ of the direct electric power supply network in response to the imposed disruption, for a converter of the prior art. This evolution of the power $P_{dc}$ of the direct electric power supply network reflects the effect of "virtual capacitance", the converter having a behaviour equivalent to that of a virtual capacitor arranged in parallel with the direct electric power supply network. FIG. 9 illustrates the same magnitudes for a converter according to the invention.

FIGS. 8 and 9 disclose that in the presence of disruption on the direct electric power supply network, the evolution of the power $P_{dc}$ of the direct electric power supply network is identical for the converter of the prior art and for the converter according to the invention. The converter according to the invention therefore produces a "virtual capacitance" effect and is understood as a virtual capacitor arranged in parallel to the direct electric power supply network.

Figure 10:
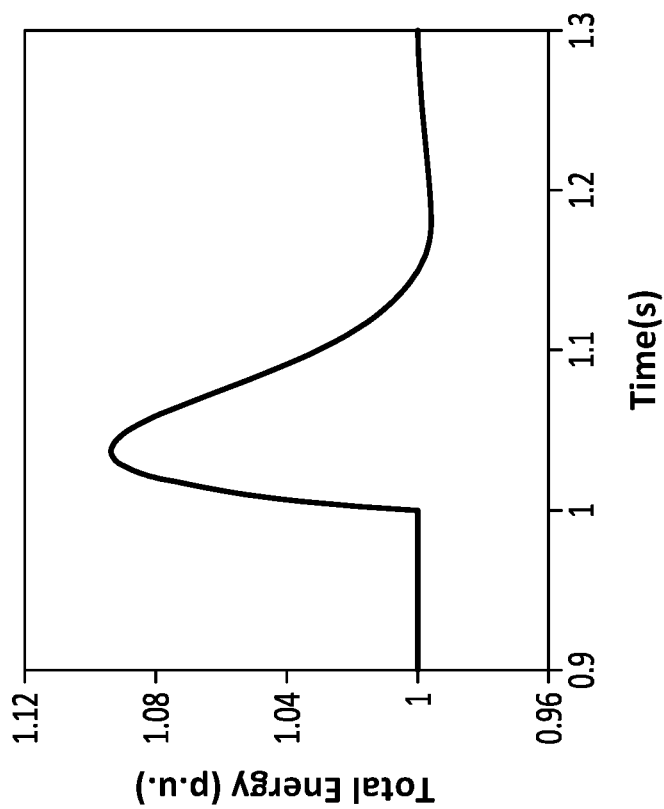
FIG. 10 illustrates the evolution of the internal energy in response to said disruption, for a converter of the prior art.

FIG. 10 illustrates the evolution of the internal energy stored in the capacitors of the sub-modules of a converter of the prior art, in response to imposed disruption.

Figure 11:
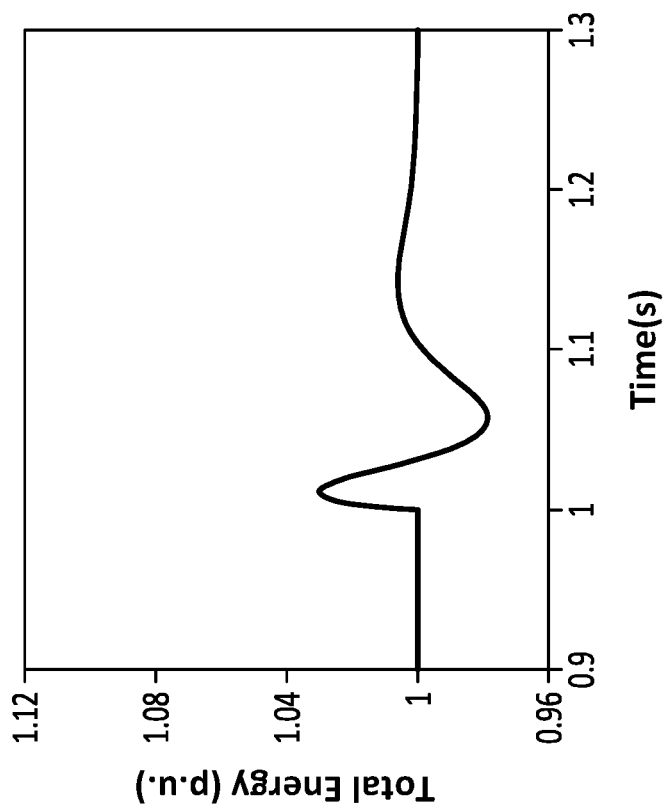
FIG. 11 illustrates the evolution of the internal energy in response to said disruption, for a converter according to the invention.

FIG. 11 illustrates the evolution of the internal energy stored in the capacitors of the sub-modules of a converter according to the invention, in response to imposed disruption.

It is evident, because of the converter according to the invention, that the energy is best regulated and that it does not increase suddenly and abruptly, as in the prior art. In particular, because of the invention, the internal energy of the converter tends more rapidly towards its nominal value. The internal energy of the converter is therefore best controlled because of the control circuit according to the invention, and especially because of the energy management circuit. In fact, the latter occurs in the alternating part of the converter and effectively controls the internal energy of the converter despite disruption on the direct electric power supply network.

Figure 12:
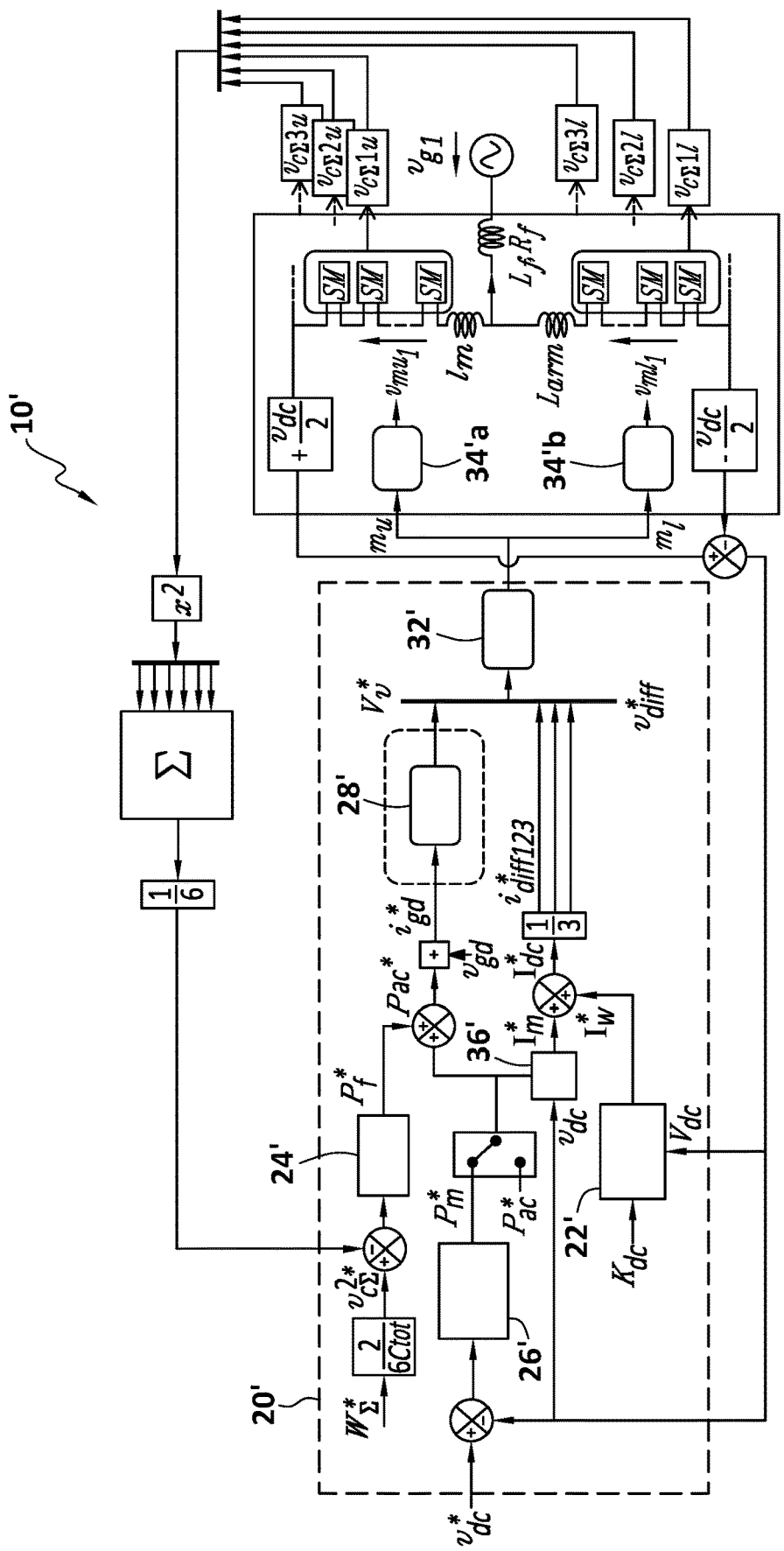
FIG. 12 illustrates a second embodiment of a multi-level modular converter provided with a control circuit according to the invention.

FIG. 12 illustrates a second embodiment of a converter 10' according to the invention, provided with a control circuit 20' according to the invention. In this example, the converter is controlled in terms of current. As in the example of FIG. 6, the control circuit comprises a power management circuit 24' configured to deliver an operating power setpoint $P^*_f$. It also comprises a regulator 28' of the alternating current $i_{gd}$, a modulation member 32' and two equilibrium members 34a' and 34b'.

In this embodiment, the control circuit 20' comprises a computer 22' configured to calculate an internal current setpoint $I^*_W$ for the capacitors of the sub modules of the arms.

Figure 13:
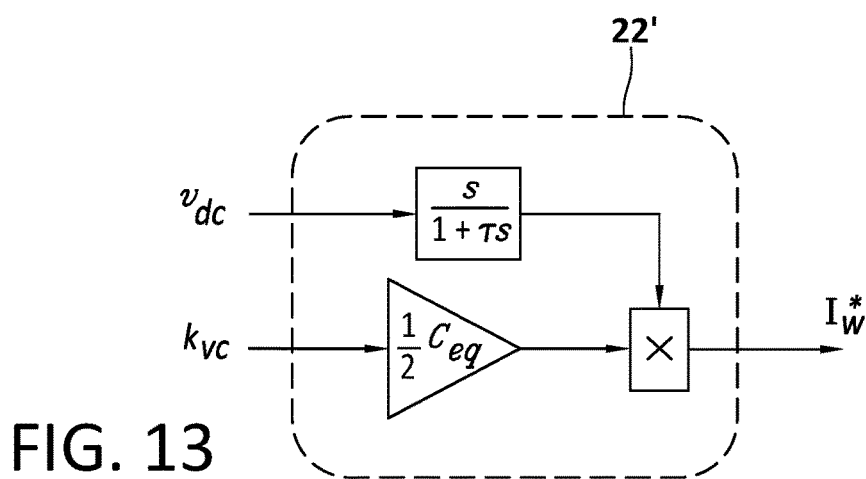
FIG. 13 illustrates a computer of the converter of FIG. 12.

Such a computer is illustrated in FIG. 13. As is evident from this figure, the internal current setpoint $I^*_W$ is calculated from an adjustable virtual inertia coefficient $k_{VC}$, at input of the computer 22', and a nominal value of the voltage $v_{dc}$ at the point of connection of the converter to the direct electric power supply network 120. This computer 22' also executes a derived function and a filter of the first order.

The control circuit 20' further comprises a regulator 26' of the voltage at the point of connection of the converter to the direct electric power supply network 120, receiving at input the result of comparison between a voltage setpoint $v^*_{dc}$ at the point of connection of the converter 10 to the direct electric power supply network 120 and a value $v_{dc}$ collected on the direct electric power supply network. The regulator 26' delivers a power setpoint $P^*_m$ for regulating the direct voltage of said converter 10.

The control circuit 20' additionally comprises a divider circuit 36 for dividing said power $P^*_m$ by a nominal value of the voltage $v_{dc}$ at the point of connection of the converter to the direct electric power supply network 120, so as to determine a current operating setpoint $I^*_m$. Said current operating setpoint $I^*_m$ is then compared to the internal current setpoint $I^*_W$ to determine a current setpoint $I^*_{dc}$ to be transmitted to the direct electric power supply network.

The invention claimed is:

1. A multilevel modular voltage converter for converting alternating voltage into direct voltage and inversely, comprising:
   a direct part intended to be connected to a direct electric power supply network;
   an alternating part intended to be connected to an alternating electric power network;
   a plurality of legs, each leg comprising an upper arm and a lower arm, each arm comprising a plurality of sub-modules controllable individually by a control member specific to each sub-module and each sub-module comprising a capacitor connectable in series in the arm when the control member of the sub-module is in a controlled state, each arm modelled by a modelled voltage source connected to a duty cycle dependent on a number of capacitors placed in series in the arm, the modelled voltage source connected in parallel to a modelled capacitor corresponding to a total capacitance of the arm; and
   a control circuit of the converter comprising a computer of an internal command setpoint of the converter by application of a function having an adjustable input parameter,
   wherein the control circuit further comprises an energy management circuit configured to deliver an operating power setpoint as a function of the voltage at the terminals of each modelled capacitor, the operating power setpoint being utilised to determine a power setpoint to be transmitted to the alternating electric power supply network, the control circuit being configured to regulate the voltage at the point of connection of the converter to the direct electric power supply network and the voltage at the terminals of each modelled capacitor as a function of the internal command setpoint and of the power setpoint to be transmitted to the alternating electric power supply network.

2. The converter according to claim 1, wherein the computer is configured to calculate the internal command setpoint by application of a derived function and a filtering function.

3. The converter according to claim 1, wherein the adjustable input parameter is an adjustable virtual inertia coefficient $k_{VC}$.

4. The converter according to claim 1, wherein the internal command setpoint is an internal power setpoint $P^*_W$.

5. The converter according to claim 4, wherein the computer is configured to calculate the internal power setpoint $P^*_W$, of the converter according to the function:

$$P^*_W = \frac{1}{2} C_{eq} k_{VC} \times \left( v_{dc}^2 \times \frac{s}{1 + \tau s} \right)$$

where $C_{eq} = 6 C_{tot}$ and $C_{tot}$ is the total capacitance in an arm of the modelled capacitor, $v_{dc}$ is the voltage at the point of connection of the converter to the direct electric power supply network and $r$ is a time constant.

6. The converter according to claim 4, wherein the internal power setpoint $P^*_W$ is utilised to determine a power setpoint $P^*_{dc}$ to be transmitted to the direct electric power supply network.

7. The converter according to claim 1, wherein the internal command setpoint is an internal current setpoint $I^*_W$.

8. The converter according to claim 7, wherein the computer is configured to calculate the internal current setpoint $I^*_W$, according to the function:

$$I^*_W = C_{eq} k_{VC} \times \left( v_{dc} \times \frac{s}{1+\tau s} \right)$$

where $C_{eq}=6C_{tot}$ and $C_{tot}$ is the total capacitance in an arm of the modelled capacitor, $v_{dc}$ is the voltage at the point of connection of the converter to the direct electric power supply network and $r$ is a time constant.

9. The converter according to claim 7, wherein the internal current setpoint $I^*_W$ is utilised to determine a current setpoint $I^*_{dc}$ to be transmitted to the direct electric power supply network.

10. The converter according to claim 1, wherein the energy management circuit receives at input the result of comparison between a voltage setpoint at the terminals of each modelled capacitor, squared, and an average of the square of the voltages at the terminals of the modelled capacitors.

11. The converter according to claim 1, wherein the control circuit is configured to make a change in variable to control intermediate variables of current $i_{diff}$ and $i_{gd}$ and voltage $v_{diff}$ and $v_{gd}$, where $i_{diff}$ and $v_{diff}$ are related to the direct electric power supply network and $i_{gd}$ and $V_{gd}$ are related to the alternating electric power supply network.

12. The converter according to claim 11, wherein the control circuit comprises a regulator of the current $i_{gd}$ having at input a setpoint $i^*_{gd}$ corresponding to the current $i_{gd}$.

13. The converter according to claim 11, wherein the control circuit comprises a regulator of the current $i_{diff}$ having at input a setpoint $i^*_{diff}$ corresponding to the current $i_{diff}$.

14. The converter according to claim 1, wherein the control circuit comprises a regulator of the voltage at the point of connection of the converter to the direct electric power supply network, the regulator configured to determine a power setpoint for regulation of the direct voltage of said converter as a function of a voltage setpoint at the point of connection of the converter to the direct electric power supply network and of a voltage value at the point of connection of the converter to the direct electric power supply network collected on said direct electric power supply network.

15. A control process of a multilevel modular voltage converter, the converter converting alternating voltage into direct voltage and inversely, and comprising a direct part intended to be connected to a direct electric power supply network and an alternating part intended to be connected to an alternating electric power network, the converter comprising a plurality of legs, each leg comprising an upper arm and a lower arm, each arm comprising a plurality of sub-modules controllable individually by a control member of the sub-module and comprising a capacitor connected in series in the arm in a controlled state of the control member of the sub-module, each arm capable of being modelled by a modelled voltage source connected to a duty cycle dependent on a number of capacitors placed in series in the arm, the modelled voltage source being connected in parallel to a modelled capacitor corresponding to a total capacitance of the arm, the process comprising:
- calculating an internal command setpoint of the converter by application of a function having an adjustable input parameter,
- determining an operating power setpoint as a function of the voltage at the terminals of each modelled capacitor;
- determining a power setpoint to be transmitted to the alternating electric power supply network from the operating power setpoint; and
- regulating the voltage at the point of connection of the converter to the direct electric power supply network and of the voltage at the terminals of each modelled capacitor as a function of said internal command setpoint and of said power setpoint to be transmitted to the alternating electric power supply network.

16. A control process of a converter according to claim 15, wherein the adjustable input parameter is an adjustable virtual inertia coefficient $k_{VC}$.

17. A control circuit for controlling a multi-level modular converter for converting alternating voltage into direct voltage and inversely, the converter comprising:
- a direct part intended to be connected to a direct electric power supply network;
- an alternating part intended to be connected to an alternating electric power network;
- a plurality of legs, each leg comprising an upper arm and a lower arm, each arm comprising a plurality of sub-modules controllable individually by a control member specific to each sub-module and each sub-module comprising a capacitor connectable in series in the arm when the control member of the sub-module is in a controlled state, each arm modelled by a modelled voltage source connected to a duty cycle dependent on a number of capacitors placed in series in the arm, the modelled voltage source connected in parallel to a modelled capacitor corresponding to a total capacitance of the arm,
- wherein the control circuit comprises a computer of an internal command setpoint of the converter by application of a function having an adjustable input parameter, the control circuit further comprising an energy management circuit configured to deliver an operating power setpoint as a function of the voltage at the terminals of each modelled capacitor, the operating power setpoint being utilised to determine a power setpoint to be transmitted to the alternating electric power supply network, the control circuit being configured to regulate the voltage at the point of connection of the converter to the direct electric power supply network and the voltage at the terminals of each modelled capacitor as a function of the internal command setpoint and of the power setpoint to be transmitted to the alternating electric power supply network.

* * * * *